(12) United States Patent
Minkebige et al.

(10) Patent No.: US 9,884,420 B2
(45) Date of Patent: Feb. 6, 2018

(54) ROBOTIC TURNTABLE ASSEMBLY

(71) Applicant: ABB Technology AG, Zurich (CH)

(72) Inventors: David A. Minkebige, Lake Orion, MI (US); Brant E. Blasier, Brighton, MI (US)

(73) Assignee: ABB SCHWEIZ AG, Baden (CH)

( * ) Notice: Subject to any disclaimer, the term of this patent is extended or adjusted under 35 U.S.C. 154(b) by 61 days.

(21) Appl. No.: 14/734,125

(22) Filed: Jun. 9, 2015

(65) Prior Publication Data

US 2016/0361811 A1    Dec. 15, 2016

(51) Int. Cl.
| | |
|---|---|
| *A47B 91/00* | (2006.01) |
| *B25H 1/02* | (2006.01) |
| *B25H 1/10* | (2006.01) |
| *B23K 37/04* | (2006.01) |

(52) U.S. Cl.
CPC ........... *B25H 1/02* (2013.01); *B23K 37/0461* (2013.01); *B25H 1/10* (2013.01)

(58) Field of Classification Search
CPC .................................................... A47B 11/00
USPC ............... 108/94, 103, 104, 139, 142, 50.12
See application file for complete search history.

(56) References Cited

U.S. PATENT DOCUMENTS

| | | | | |
|---|---|---|---|---|
| 4,788,397 A * | 11/1988 | Danley | ..................... | H02K 7/10 108/139 |
| 5,149,043 A * | 9/1992 | Grundmann | ........... | A47B 11/00 108/139 |
| 7,753,629 B1 * | 7/2010 | McCulloch | .............. | B23Q 1/52 108/7 |
| 7,770,336 B2 * | 8/2010 | Jaekel | ................... | B23P 21/006 108/103 |
| 2014/0261106 A1 * | 9/2014 | Knapp | ....................... | B61J 1/04 108/139 |

\* cited by examiner

*Primary Examiner* — Matthew W Ing
(74) *Attorney, Agent, or Firm* — Cooper Leagl Group, LLC

(57) ABSTRACT

A robotic turntable assembly for servicing an item includes a support station for supporting the item on a first support region of the support station. The first support region is movable between an operational zone and a non-operational zone. The robotic turntable assembly includes an operational assembly that services the item when the first support region supports the item and the first support region is within the operational zone. The operational assembly engages the support station and moves the first support region between the operational zone and the non-operational zone.

19 Claims, 5 Drawing Sheets

ROBOTIC TURNTABLE ASSEMBLY

BACKGROUND

A robotic turntable assembly can comprise a support station upon which one or more items can be supported. The support station can be moved between a variety of positions, such as with a drive motor.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

According to an aspect, a robotic turntable assembly for servicing an item comprises a support station for supporting the item on a first support region of the support station. The first support region is movable between an operational zone and a non-operational zone. The robotic turntable assembly comprises an operational assembly that is configured to service the item when the first support region supports the item and when the first support region is within the operational zone. The operational assembly is configured to engage the support station and move the first support region between the operational zone and the non-operational zone.

According to another aspect, a robotic turntable assembly for servicing an item is provided. The robotic turntable assembly comprises a support station for supporting the item. The support station comprises a first support region, a second support region, and a protective bather disposed between the first support region and the second support region. The protective barrier is configured to at least one of shield the first support region from the second support region or shield the second support region from the first support region. The robotic turntable assembly comprises an operational assembly that is configured to service the item when the first support region supports the item and the first support region is in proximity to the operational assembly. The operational assembly is configured to engage the support station and move the support station between a first position, in which the first support region is in proximity to the operational assembly, and a second position, in which the first support region is not in proximity to the operational assembly.

According to another aspect, a method for servicing an item with a robotic turntable assembly is provided. The method comprises engaging a support station of the robotic turntable assembly by an operational assembly of the robotic turntable assembly. The support station can be moved into a first position, in which a first support region of the support station is in proximity to the operational assembly, where the first support region supports the item such that the operational assembly services the item when the first support region is in proximity to the operational assembly. The method comprises servicing the item by the operational assembly. The method comprises engaging the support station by the operational assembly to move the support station from the first position to a second position, in which the first support region is not in proximity to the operational assembly when in the second position.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

FIGURES

The application is illustrated by way of example and not limitation in the figures of the accompanying drawings, in which like references generally indicate similar elements and in which.

DESCRIPTION

Figure 1:
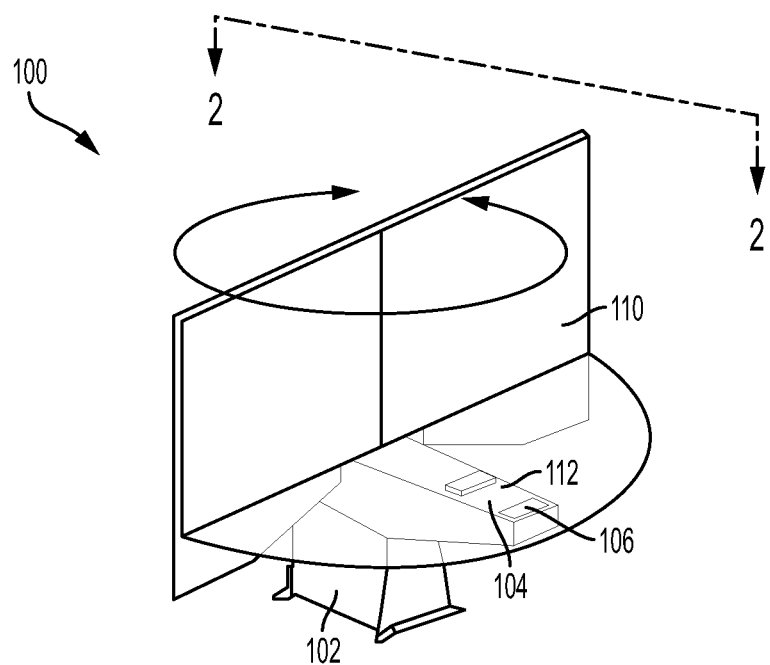
FIG. 1 illustrates an example portion of an example robotic turntable assembly.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

FIG. 1 is an illustration of an example robotic turntable assembly 100. The robotic turntable assembly 100 can function to service an item, such as a part, a piece, an object, or the like. It will be appreciated that by servicing the item, the robotic turntable assembly 100 can perform any number of functions. For example, some of the functions that the robotic turntable assembly 100 can perform when servicing the item may include, but are not limited to, welding, soldering, assembling, manipulating, moving, positioning, etc.

The robotic turntable assembly 100 comprises a base 102. In an example, the base 102 can rest upon a surface, such as a floor, for example. In a possible example, the base 102 can be relatively non-movable with respect to the surface, and, in some examples, the base 102 can be fixed to, attached to, coupled to, etc. the surface.

The robotic turntable assembly 100 comprises a support station 104. In an example, the support station 104 can be attached to the base 102. The support station 104 can be attached to the base 102 on an opposite end of the base 102 from the surface upon which the base 102 rests. As such, in this example, the support station 104 can be spaced a distance apart from the surface, such as the floor, for example. In an example, the support station 104 can be movable with respect to the base 102. For example, the support station 104 can be rotatable (e.g., about a rotational axis) with respect to the base 102, translatable (e.g., movable side to side) with respect to the base 102, etc.

In some examples, the support station 104 can rotate with respect to the base 102 without driving structures, such as drives, motors, etc. In such an example, the support station 104 can rotate with respect to the base 102 in response to a force (e.g., a pushing force, a pulling force, etc.) that is applied to the support station 104. As such, a pushing or pulling force along a first direction can cause the support station 104 to rotate with respect to the base 102 in the first direction. A pushing or pulling force along a second direction can cause the support station 104 to rotate with respect to the base 102 in the second direction. In these examples, driving structures (e.g., drives, motors, etc.) may not be needed to provide rotation of the support station 104 with respect to the base 102. By not requiring the driving structures (e.g., drives, motors, etc.), a number of benefits are provided by the robotic turntable assembly 100 including, but not limited to, a lower cost robotic turntable assembly 100, a robotic turntable assembly 100 that is relatively easier to assemble, a robotic turntable assembly 100 that is relatively easier to maintain and provide maintenance to, etc.

The support station 104 can support an item 106. In an example, the item 106 can rest upon, be supported by, etc. the support station 104. The item 106 comprises any number of structures, such as parts, components, pieces, etc. In some examples, the item 106 comprises a metal material, though, in other examples, the item 106 may be partially metal or non-metal. The term "item" 106 is understood not to be limited to a single item. Rather, the item 106 may comprise a plurality of items (e.g., one or more) that may be supported on the support station 104.

Figure 2:
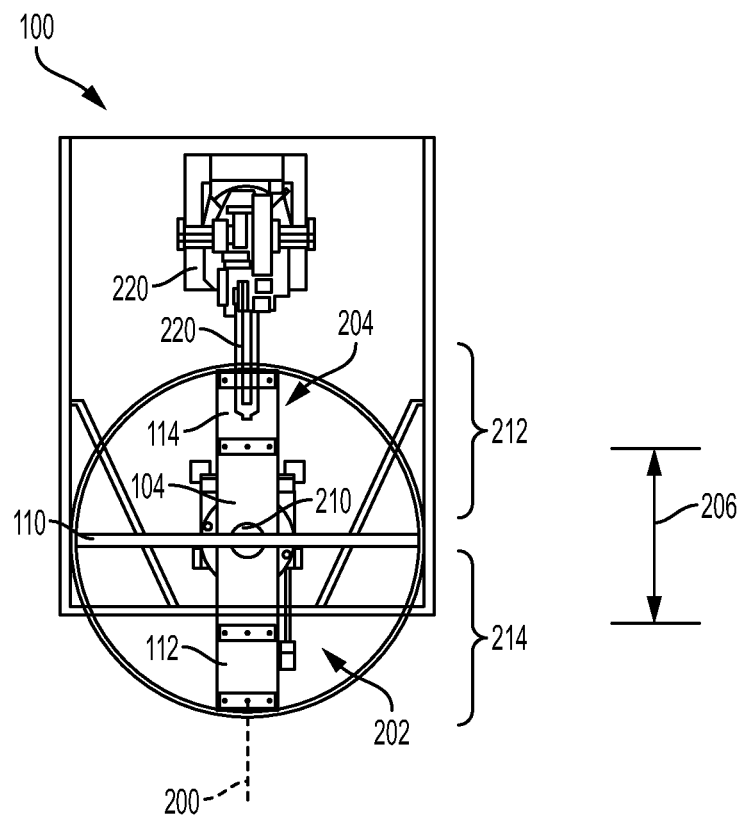
FIG. 2 illustrates a top down view of an example portion of an example robotic turntable assembly.

A protective bather 110 may be disposed between a first support region 112 and a second support region 114 (e.g., wherein the second support region 114 is illustrated in FIG. 2 due to the second support region 114 being obstructed from view by the protective barrier 110 in FIG. 1) of the support station 104. In an example, the protective barrier 110 may comprise a shield and/or a shielding material. As such, the protective barrier 110 can at least one of shield the first support region 112 from the second support region 114 or shield the second support region 114 from the first support region 112. In the illustrated example, the protective barrier 110 has a substantially rectangular shape, though, other non-rectangular shapes are envisioned. Additionally, the protective barrier 110 may be positioned substantially at a midpoint of the support station 104, though, in other examples, the protective barrier 110 can be positioned closer to the first support region 112 or the second support region 114. In an example, when a welding process occurs at the first support region 112 or the second support region 114, the protective barrier 110 can shield the other of the first support region 112 or the second support region 114 from ultraviolet light, sparks, infrared light, heat, and other effects that are associated with the welding process. As such, the protective barrier 110 can function to protect a user, an operator, etc. from effects that are associated with the servicing (e.g., welding, etc.) of the item 106.

Turning to FIG. 2, a top down view of the robotic turntable assembly 100 is illustrated as viewed from the perspective indicated by lines 2-2 of FIG. 1. In the illustrated example, the first support region 112 is located at a first side of the support station 104 while the second support region 114 is located at a second side of the support station 104. In an example, the support station 104 extends along an axis 200. The first support region 112 can be located at a first location 202 along the axis 200. The second support region 114 can be located at a second location 204 along the axis 200. In this example, the first location 202 is at an end of the support station 104 while the second location 204 is at an opposing end of the support station 104.

In an example, the second support region 114 is spaced a first distance 206 apart from the first support region 112. The first distance 206 can comprise any number of dimensions. In some examples, the first distance 206 may be between about 0.30 meters (~1 foot) to about 3.05 meters (~10 feet). In an example, the protective barrier 110 may be located between the first support region 112 and the second support region 114 so as to be located within the first distance 206.

The support station 104 can rotate about a rotational axis 210. In this example, the rotational axis 210 can extend into and out of the page. In an example, the rotational axis 210 is located at substantially a midpoint of the support station 104 between the first support region 112 and the second support region 114. In other examples, however, the rotational axis 210 can be offset from the midpoint of the support station 104, such as by being in closer proximity to the first support region 112 or the second support region 114. In this example, the rotational axis 210 can intersect the axis 200 along which the support station 104 extends.

The rotational axis 210 can intersect a location at which the support station 104 is movably attached with respect to the base 102. In this example, the support station 104 can be attached to the base 102 such that the support station 104 can rotate with respect to the base 102. The support station 104 can rotate about the rotational axis 210 with respect to the base 102.

The first support region 112 and the second support region 114 can be movable between an operational zone 212 and a non-operational zone 214. In this example, the operational zone 212 comprises a first location at which the item 106 can be serviced. That is, when the item 106 is in the operational zone 212, the item can be serviced by welding, soldering, assembling, manipulating, moving, positioning, etc. In this example, the non-operational zone 214 comprises a second location at which the item 106 may not be serviced. That is, when the item 106 is in the non-operational zone 214, the item 106 may be out of reach from and/or not in proximity to machines, assemblies, structures, etc. that are configured to service the item 106. In an example, the operational zone 212 and the non-operational zone 214 may be separated by the protective barrier 110. That is, the protective barrier 110 can be positioned between the operational zone 212 and the non-operational zone 214.

In this example, the support station 104 can be rotated about the rotational axis 210 to move the first support region 112 and the second support region 114 between the operational zone 212 and the non-operational zone 214. In an example, when the first support region 112 is located within the operational zone 212, the second support region 114 may be located within the non-operational zone 214. In another example, when the second support region 114 is located within the operational zone 212, the first support region 112 may be located within the non-operational zone 214. As such, rotation of the support station 104 about the rotational axis 210 can cause the first support region 112 to move between the operational zone 212 and the non-operational zone 214. Likewise, rotation of the support station 104 about the rotational axis 210 can cause the second support region 114 to move between the operational zone 212 and the non-operational zone 214.

The robotic turntable assembly 100 can comprise an operational assembly 220. The operational assembly 220 can service the item 106 when the first support region 112 supports the item 106 and the first support region 112 is within the operational zone 212. Alternately, the operational assembly 220 can service the item 106 when the second support region 114 supports the item 106 and the second support region 114 is within the operational zone 212.

The operational assembly 220 comprises any number of robotic and/or manufacturing assemblies, such as surface mount technology ("SMT") component placement systems, pick and place machines, robot welding machines, etc. In these examples, the operational assembly 220 can perform any number of tasks on the item 106 including, but not limited to, welding, soldering, assembling, manipulating, moving, positioning, etc.

The operational assembly 220 can be positioned adjacent to, in proximity to, within, etc. the operational zone 212. In this example, the operational assembly 220 can service the item 106 when the item 106 is located within the operational zone 212. The operational assembly 220 may not service the item 106 when the item 106 is within the non-operational zone 214, such as because the operational assembly 220 may not be able to reach the non-operational zone 214. As such, the operational zone 212 may be in proximity to and accessible by the operational assembly 220 while the non-operational zone 214 may not be in proximity to and/or not accessible by the operational assembly 220.

Figure 3:
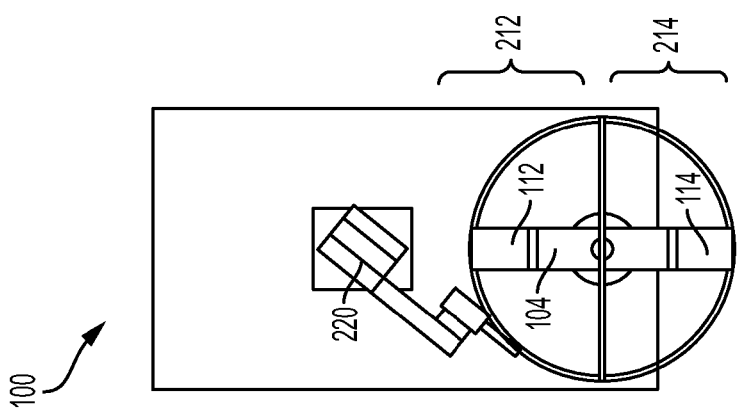
FIG. 3 illustrates an example portion of an example robotic turntable assembly, where an example support station is in a first position.

Turning to FIG. 3, the support station 104 is illustrated in a first position. In the first position, the first support region 112, which supports the item 106, may be in proximity to the operational assembly 220. In this example, the first support region 112 may be positioned within the operational zone 212 while the second support region 114 may be positioned within the non-operational zone 214. With the first support region 112 positioned within the operational zone 212, the operational assembly 220 can selectively service the item 106. That is, the operational assembly 220 can service the item 106 by providing any number of functions, services, and/or operations to the item 106, such as by welding, assembling, picking and placing, etc. the item 106.

The operational assembly 220 can engage the support station 104 and move (e.g., rotate, swivel, etc.) the support station 104 between the first position and a second position. The operational assembly 220 can engage the support station 104 in any number of ways, such as by contacting the support station 104, for example. In a possible example, the operational assembly 220 can apply a pushing and/or a pulling force to the support station 104 to cause the support station 104 to move and/or rotate about the rotational axis 210.

Figure 5:
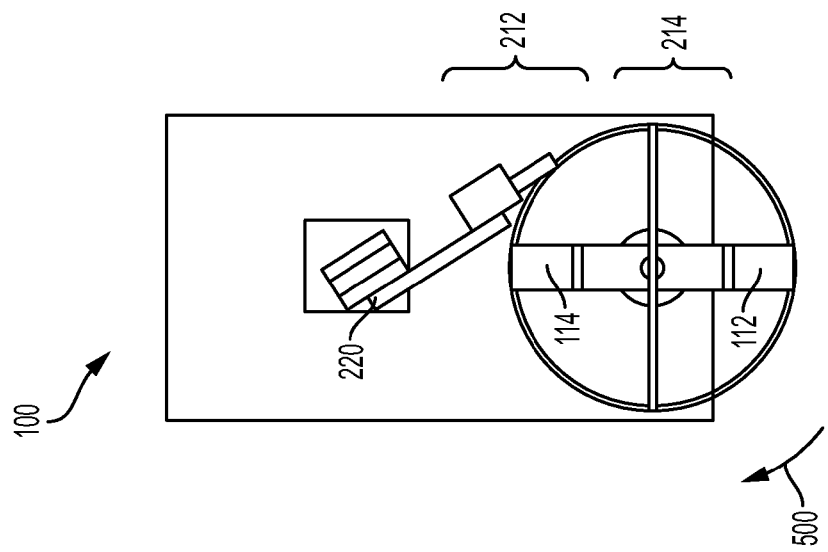
FIG. 5 illustrates an example portion of an example robotic turntable assembly, where an example support station is in a second position.
Figure 4:
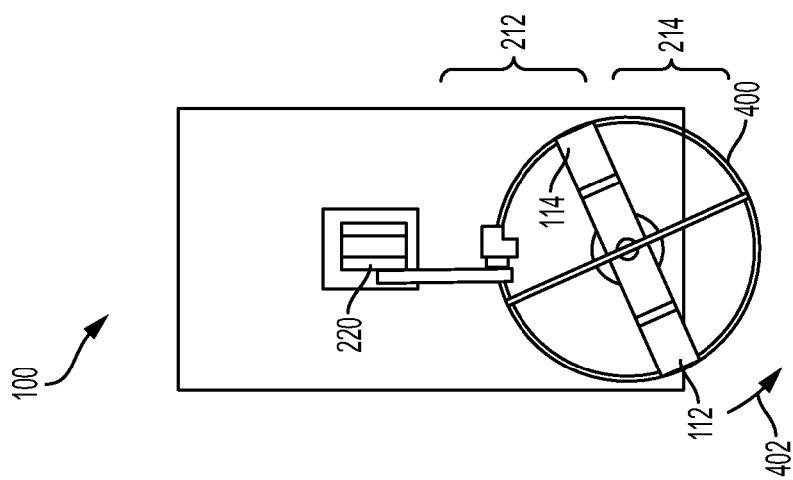
FIG. 4 illustrates an example portion of an example robotic turntable assembly, where an example support station is in an intermediate position.

Turning to FIG. 4, the support station 104 is illustrated in an intermediate position between the first position (e.g., as illustrated in FIG. 3) and a second position (e.g., as illustrated in FIG. 5). By being in the intermediate position, the first support region 112 may not be fully within the operational zone 212 such that the operational assembly 220 may not be able to reach and/or access items 106 that are supported on the first support region 112. In this example, by being in the intermediate position, the second support region 114 may not be fully within the operational zone 212 such that the operational assembly 220 may not be able to reach and/or access items 106 that are supported on the second support region 114. In this example, the first support region 112 and/or the second support region 114 may be located at an intermediate location between the operational zone 212 and the non-operational zone 214.

In some examples, the operational assembly 220 can engage a track 400 of the support station 104. The track 400 can extend circumferentially around the support station 104, such as around the first support region 112 and the second support region 114. In this example, the track 400 can have a substantially circular shape, though, in other examples, the track 400 is not so limited. Rather, in other examples, the track 400 can have a non-circular shape, such as an oval shape, a quadrilateral shape, or the like. The track 400 can comprise a substantially rigid material, such as a metal material, for example, such that the track 400 has at least some degree of rigidity, inflexibility, firmness, etc.

The operational assembly 220 can engage the track 400 in any number of ways. For example, the operational assembly 220 can grip the track 400 so as to hold, grasp, control, etc. the track 400. By gripping the track 400, the operational assembly 220 can cause the support station 104 to move. That is, the operational assembly 220 can apply a movement force to the track 400, such as a pulling force or a pushing force. This force can cause the support station 104 to rotate about the rotational axis 210.

In this example, the operational assembly 220 can cause the support station 104 to move in a first direction 402. As the operational assembly 220 moves the support station 104 along the first direction 402, the first support region 112 can be moved from the operational zone 212 to the non-operational zone 214. Likewise, as the operational assembly 220 moves the support station 104 along the first direction 402, the second support region 114 can be moved from the non-operational zone 214 to the operational zone 212.

Turning to FIG. 5, the operational assembly 220 can cause the support station 104 to rotate until the support station 104 is in the second position, as illustrated. In the second position, the first support region 112 may not be in proximity to the operational assembly 220. Rather, the first support region 112 may be within the non-operational zone 214. In the second position, the second support region 114 may be in proximity to the operational assembly 220. As such, the second support region 114 may be within the operational zone 212. In this example, the second support region 114 can support the item 106, such that the operational assembly 220 can service the item 106.

The support station 104 may remain in the second position for as long as needed by an operator. For example, while the support station 104 is in the second position, the operational assembly 220 can service the item 106 that is supported by the second support region 114. In addition or in the alternative, the operator can access the first support region 112, since the first support region 112 is in the non-operational zone. By accessing the first support region 112, the operator can add and/or remove an item from the first support region 112, arrange an item on the first support region 112, etc.

When the items 106 are located within the operational zone 212 and are being serviced by the operational assembly 220, the operator is relatively shielded from the servicing of the operational assembly 220. For example, the protective barrier 110 may be positioned between the operational zone 212 and the non-operational zone 214. The protective barrier 110 can therefore shield the operator from the effects of the operational assembly 220, such as ultraviolet light, sparks, infrared light, heat, debris, etc.

As such, the operator can access a portion of the support station 104 while the item 106 may be serviced at another portion of the support station 104. For example, when the support station 104 is in the first position, the first support region 112 is in the operational zone 212 and in proximity to the operational assembly 220 while the second support region 114 is in the non-operational zone 214. As such, the operator can access the second support region 114 (e.g., items supported on the second support region 114) while items supported by the first support region 112 may be serviced by the operational assembly 220. The protective barrier 110 can shield the second support region 114 from the operational assembly 220 and the operational zone 212.

In another example, when the support station 104 is in the second position, the second support region 114 is in the operational zone 212 and in proximity to the operational assembly 220 while the first support region 112 is in the non-operational zone 214. As such, the operator can access the first support region 112 (e.g., items 106 supported on the first support region 112) while items 106 supported by the second support region 114 may be serviced by the operational assembly 220. The protective barrier 110 can shield the first support region 112 from the operational assembly 220 and the operational zone 212.

In an example, when a user desires to move the support station 104 from the second position (e.g., as illustrated in FIG. 5) back to the first position (e.g., as illustrated in FIG. 3), the user can trigger the operational assembly 220 to cause the support station to move in a second direction 500. As the operational assembly 220 moves the support station 104 along the second direction 500, the first support region 112 can be moved from the non-operational zone 214 to the operational zone 212. Likewise, as the operational assembly 220 moves the support station 104 along the second direction 500, the second support region 114 can be moved from the operational zone 212 to the non-operational zone 214. As such, in this example, the second direction 500 is substantially opposite the first direction 402. That is, in the illustrated example, the support station 104 can be moved in a plurality of directions (e.g., the first direction 402 and the second direction 500) between the first position and the second position such that the support station 104 can rotate substantially 180° about the rotational axis 210. In other examples, however, the support station 104 can be moved in one direction between the first position and the second position, such that the support station 104 can rotate substantially 360° about the rotational axis 210.

Figure 6:
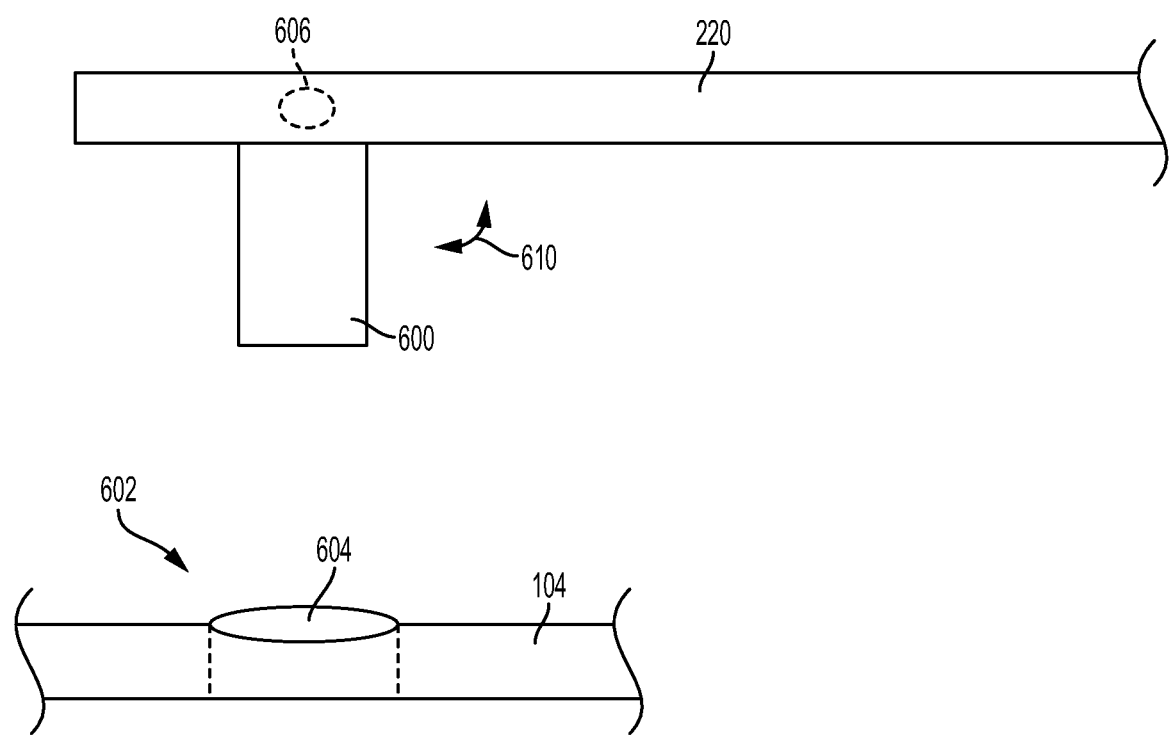
FIG. 6 illustrates an example portion of an example robotic turntable assembly.

Turning to FIG. 6, an example of a portion of the support station 104 and the operational assembly 220 is illustrated. In this example, the operational assembly 220 comprises a gripping portion 600 that is configured to engage the support station 104 and move the first support region 112 between the operational zone 212 and the non-operational zone 214 and, as such, move the support station 104 between the first position (e.g., as illustrated in FIG. 3) and the second position (e.g., as illustrated in FIG. 5). In a possible example, the gripping portion 600 comprises a projection, an extension, a protrusion, or the like. The gripping portion 600 can project from the operational assembly 220, such as an arm of the operational assembly 220.

The gripping portion 600 of the operational assembly 220 can engage an engagement feature 602 of the support station 104. In this example, the engagement feature 602 comprises an opening 604. The opening 604 may be sized and shaped to engage with (e.g., receive) the gripping portion 600. That is, in an example, the gripping portion 600 can be selectively received within the opening 604 of the support station 104. In this example, the operational assembly 220 can engage the support station 104 by inserting the gripping portion 600 into the opening 604. This engagement between the gripping portion 600 and the opening 604 can facilitate movement of the support station 104. That is, the operational assembly 220 can cause the support station 104 to move, such as between the first position and the second position.

The opening 604 can be located at any number of locations within the support station 104. In a possible example, one or more openings 604 can be provided within the first support region 112 while one or more openings 604 can be provided within the second support region 114.

In some examples, the gripping portion 600 can be pivotably attached to the operational assembly 220. In such an example, a pivoting attachment structure 606 can serve as the attachment structure for attaching the gripping portion 600 to the operational assembly 220. In some examples, the pivoting attachment structure 606 comprises a ball bearing, a ball and socket joint, a hinge joint, a condyloid joint, other types of joints etc.

In these examples, the gripping portion 600 can be movable (e.g., illustrated with arrowhead 610) with respect to the operational assembly 220 so as to more easily be inserted into the opening 604 and/or removed from the opening 604. In a possible example, the gripping portion 600 can pivot as the operational assembly 220 causes the support station 104 to rotate. After the support station 104 has rotated past a certain point, the gripping portion 600 can release from the opening 604, thus allowing for the support station 104 to move between the first position and the second position.

Figure 7:
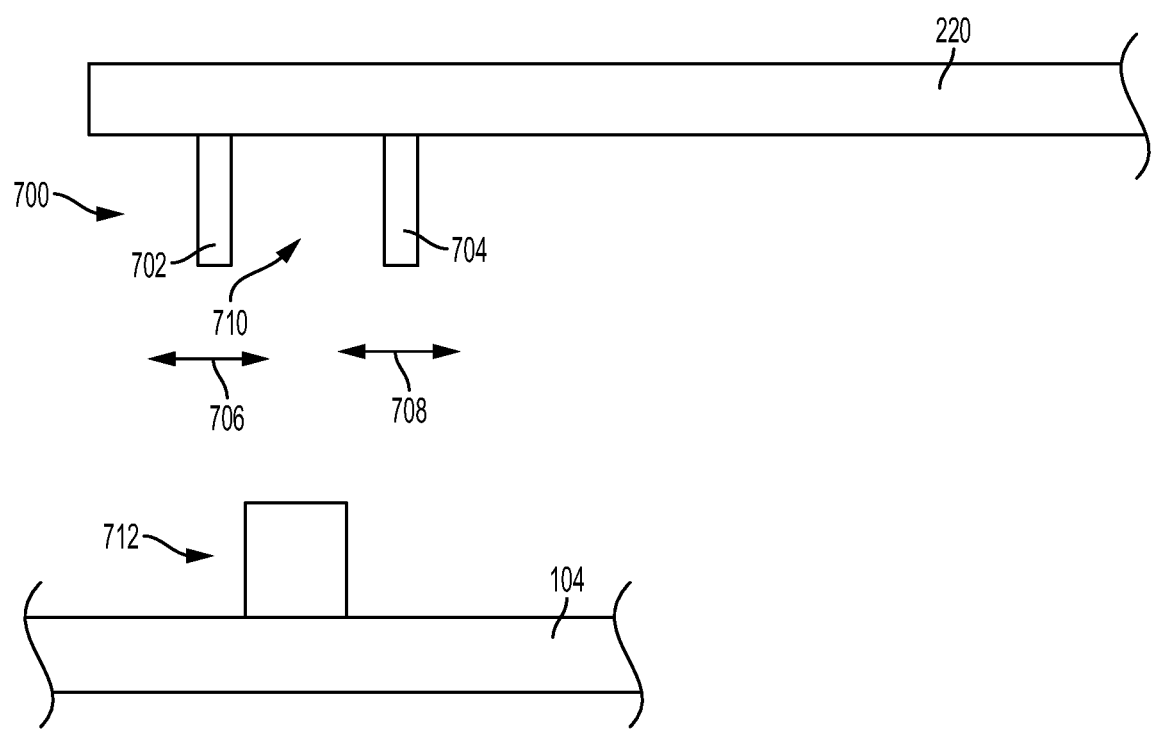
FIG. 7 illustrates an example portion of an example robotic turntable assembly.

Turning to FIG. 7, another example of a portion of the support station 104 and the operational assembly 220 is illustrated. In this example, the operational assembly 220 comprises a gripping portion 700 that is configured to engage the support station 104 and move the first support region 112 between the operational zone 212 and the non-operational zone 214.

In this example, the gripping portion 700 comprises a first gripping structure 702 and a second gripping structure 704. The first gripping structure 702 and the second gripping structure 704 can project from the operational assembly 220, such as by comprising projections, extensions, protrusions, or the like. The first gripping structure 702 can be movable (e.g., illustrated with arrowhead 706) with respect to the operational assembly 220. In this example, the first gripping structure 702 can be movable (e.g., 706) in one or more directions, such as in a leftward direction and a rightward direction with respect to FIG. 7. The second gripping structure 704 can be movable (e.g., illustrated with arrowhead 708) with respect to the operational assembly 220. In this example, the second gripping structure 704 can be movable (e.g., 708) in one or more directions, such as in a leftward direction and a rightward direction with respect to FIG. 7.

Together, the first gripping structure 702 and the second gripping structure 704 can define an opening 710 therebetween. The opening 710 can be made larger or smaller than as illustrated, such as due to the first gripping structure 702 moving 706 and/or the second gripping structure 704 moving 708 away from each other or towards each other.

In this example, the gripping portion 700 can engage an engagement feature 712 of the support station 104. In a possible example, the engagement feature 712 comprises a projection, an extension, a protrusion, or the like. The engagement feature 712 can project from the support station 104, such as towards the operational assembly 220. In an example, one or more engagement features 712 can be provided on and/or within the first support region 112. In an example, one or more engagement features 712 can be provided on and/or within the second support region 114. As such, the gripping portion 700 can grip the engagement features 712 when either the first support region 112 or the second support region 114 are located in proximity to the operational assembly 220 within the operational zone 212.

The gripping portion 700 of the operational assembly 220 can engage the engagement feature 712 of the support station 104. In this example, the first gripping structure 702 and the second gripping structure 704 can move (e.g., 706, 708) so as to accommodate for the engagement feature 712. That is, the engagement feature 712 can be received within the opening 710 that is defined between the first gripping structure 702 and the second gripping structure 704. This engagement between the gripping portion 700 and the engagement feature 712 can facilitate movement of the support station 104. For example, the operational assembly 220 can cause the support station 104 to move, such as between the first position and the second position.

It will be appreciated that the gripping portion 700 is not limited to engaging the engagement feature 712. In another example, the gripping portion 700 can engage (e.g., contact, grip, etc.) the track 400 of the support station 104 to cause the support station 104 to move. In another example, the gripping portion 700 can engage the first support region 112 and/or the second support region 114, such as an edge, a side, a feature, etc. of the first support region 112 and/or the second support region 114. In these examples, the gripping portion 700 can engage the support station 104 in any number of ways so as to cause movement of the support station 104 about the rotational axis 210.

In other examples, the operational assembly 220 is not limited to comprising the gripping portion 600, 700. Rather, the operational assembly 220 may engage the support station 104 by contacting the support station 104 (e.g., instead of gripping the support station 104). As such, the operational assembly 220 can provide a pushing and/or a pulling force to the support station 104 to cause the support station 104 to move. In further examples, the respective locations of the gripping portions 600, 700 can be switched with the engagement features 602, 712. That is, the operational assembly 220 may comprise the engagement features 602, 712 while the support station 104 may comprise the gripping portions 600, 700. In such an example, the operational assembly 220 can provide a force to the support station 104 to cause the support station to move (e.g., rotate about the rotational axis 210) in a similar manner as described with respect to FIGS. 6 and 7.

Figure 8:
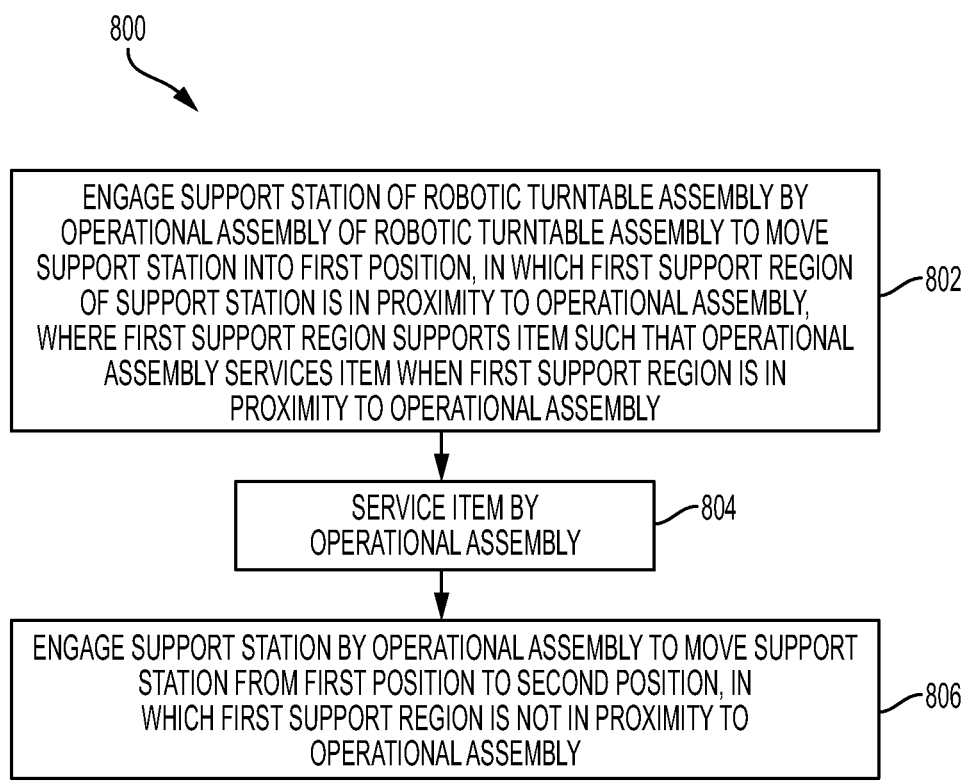
FIG. 8 illustrates an example method for servicing an item with a robotic turntable assembly.

Turning to FIG. 8, an example method 800 for servicing an item 106 with the robotic turntable assembly 100 is provided. The method 800 comprises, at 802, engaging the support station 104 of the robotic turntable assembly 100 by the operational assembly 220 of the robotic turntable assembly 100 to move the support station 104 into the first position. In the first position, the first support region 112 of the support station 104 is in proximity to the operational assembly 220. The first support region 112 can support the item 106 such that the operational assembly 220 can service the item 106 when the first support region 112 is in proximity to the operational assembly 220.

The method 800 comprises, at 804, servicing the item 106 by the operational assembly 220. The operational assembly 220 can perform any number of functions when servicing the item 106. For example, some of the functions that the robotic turntable assembly 100 can perform may include, but are not limited to, welding, soldering, assembling, manipulating, moving, positioning, etc. the item 106.

The method 800 comprises, at 806, engaging the support station 104 by the operational assembly 220 to move the support station 104 from the first position to the second position, in which the first support region 112 is not in proximity to the operational assembly 220. The operational assembly 220 can engage the support station 104 in any number of ways. For example, the operational assembly 220 may comprise a gripping portion 600, 700 that is configured to engage an engagement feature 602, 712 of the support station 104. In another example, the operational assembly 220 can provide a pushing or pulling force to the support station 104, such as by contacting the support station 104. In these examples, movement of the operational assembly 220 can cause movement of the support station 104, such as in the first direction or the second direction.

The robotic turntable assembly 100 that is illustrated and described herein may not be provided with driving structures, such as drives, motors, etc. Rather, movement of the support station 104 may be caused by the operational assembly 220 engaging the support station 104 and providing a force to the support station 104. This force may be sufficient to cause the support station 104 to move, such as about the rotational axis 210. In these examples, by not providing the robotic turntable assembly 100 with the driving structures, manufacturing, assembly, maintenance, and/or repair of the robotic turntable assembly 100 is simplified. Likewise, a cost of the robotic turntable assembly 100 is also reduced due to driving structures not being provided.

As used in this application, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component generally correspond to component A and component B or two different or two identical components or the same component.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A robotic turntable assembly for servicing an item, the robotic turntable assembly comprising:
a support station for supporting the item on a first support region of the support station, the first support region movable between an operational zone and a non-operational zone; and
an operational assembly that is configured to service the item when the first support region supports the item and the first support region is within the operational zone, the operational assembly comprising an arm having a gripping portion that selectively grips the support station and moves the first support region between the operational zone and the non-operational zone.

2. The robotic turntable assembly of claim 1, wherein the support station comprises a second support region spaced a first distance apart from the first support region.

3. The robotic turntable assembly of claim 2, wherein the support station comprises a protective barrier disposed between the first support region and the second support region, the protective barrier configured to at least one of shield the first support region from the second support region or shield the second support region from the first support region.

4. The robotic turntable assembly of claim 1, wherein the support station is configured to rotate about a rotational axis such that the first support region is movable between the operational zone and the non-operational zone.

5. The robotic turntable assembly of claim 4, wherein the support station is rotatable in a first direction, such that the first support region is movable from the operational zone to the non-operational zone in the first direction, and a second direction, such that the first support region is movable from the non-operational zone to the operational zone in the second direction.

6. The robotic turntable assembly of claim 5, wherein the second direction is substantially opposite the first direction.

7. The robotic turntable assembly of claim 1, wherein the support station comprises a track that extends circumferentially around the first support region, at least a portion of the track spaced apart from the first support region.

8. The robotic turntable assembly of claim 7, wherein the gripping portion of the operational assembly is configured to engage an engagement feature and grip the track.

9. The robotic turntable assembly of claim 7, wherein a diameter of the track is greater than a maximum length of the support station.

10. A robotic turntable assembly for servicing an item, the robotic turntable assembly comprising:
a support station for supporting the item on a surface that lies within a plane, the support station comprising:
a first support region;
a second support region; and
a protective barrier disposed between the first support region and the second support region, the protective barrier extending from the surface of the support station within a second plane that is non-parallel to the plane, the protective barrier configured to at least one of shield the first support region from the second support region or shield the second support region from the first support region; and
an operational assembly that is configured to service the item when the first support region supports the item and the first support region is in proximity to the operational assembly, the operational assembly configured to engage the support station and move the support station between a first position, in which the first support region is in proximity to the operational assembly, and a second position, in which the first support region is not in proximity to the operational assembly.

11. The robotic turntable assembly of claim 10, wherein the support station extends along an axis, the first support region is located at a first location along the axis, and the second support region is located at a second location along the axis.

12. The robotic turntable assembly of claim 11, wherein the support station is configured to rotate about a rotational axis such that the first support region is movable between an operational zone and a non-operational zone.

13. The robotic turntable assembly of claim 12, wherein the rotational axis is configured to intersect the axis along which the support station extends.

14. The robotic turntable assembly of claim 11, comprising a track that extends circumferentially around the first support region and the second support region.

15. The robotic turntable assembly of claim 14, wherein the operational assembly is configured to engage the track so as to move the support station between the first position and the second position.

16. The robotic turntable assembly of claim 11, wherein the support station is rotatable in a first direction, such that the first support region is movable from an operational zone to a non-operational zone in the first direction, and a second direction, such that the first support region is movable from the non-operational zone to the operational zone in the second direction.

17. The robotic turntable assembly of claim 10, wherein the item and the protective barrier are positioned on a same side of the plane as the protective barrier.

18. The robotic turntable assembly of claim 10, wherein the second plane is at an angle with respect to the plane that is between about 45 degrees and about 135 degrees.

19. The robotic turntable assembly of claim 10, wherein the operational assembly is configured to service the item by performing at least one of welding, soldering, assembling, manipulating, moving, or positioning of the item.

* * * * *